United States Patent [19]
Song

[11] Patent Number: 5,694,341
[45] Date of Patent: Dec. 2, 1997

[54] METHOD AND APPARATUS FOR MEASURING A WEIGHT OF A STIRRING FLUID

[75] Inventor: Jun Il Song, Kyungsangnam-Do, Rep. of Korea

[73] Assignee: LG Electronics Inc., Seoul, Rep. of Korea

[21] Appl. No.: 547,999

[22] Filed: Oct. 25, 1995

[30] Foreign Application Priority Data

Oct. 27, 1994 [KR] Rep. of Korea ............... 1994-27646

[51] Int. Cl.$^6$ .................................................. G01N 5/00
[52] U.S. Cl. ................................. 364/567; 73/54.31
[58] Field of Search ............................ 364/567, 502; 366/141, 276, 211, 273, 349; 73/54.31; 324/772, 207.17, 207.2, 207.25

[56] References Cited

U.S. PATENT DOCUMENTS

| | | | |
|---|---|---|---|
| H355 | 10/1987 | Skelton et al. .................. | 378/80 |
| 4,054,270 | 10/1977 | Gugger ............................ | 366/143 |
| 4,568,192 | 2/1986 | Kudermann ..................... | 366/146 |
| 4,568,195 | 2/1986 | Herz ................................ | 366/274 |
| 4,911,556 | 3/1990 | Lim ................................. | 366/279 |
| 4,991,973 | 2/1991 | Maaz ............................... | 366/141 |
| 5,261,742 | 11/1993 | Lockhart ......................... | 366/141 |

FOREIGN PATENT DOCUMENTS 1522617  8/1978  United Kingdom .

Primary Examiner—Emanuel T. Voeltz
Assistant Examiner—Thomas Peeso
Attorney, Agent, or Firm—Ladas & Parry

[57] ABSTRACT

A stirring apparatus according to the present invention detects a weight of a stirring fluid, such as water or some other fluid, by using a hall sensor. The present invention, a method and apparatus for measuring a weight of a stirring fluid, detects the number of revolutions of a stirring motor, which varies according to the amount of an object fluid, by using a hall sensor to compute a weight of the fluid corresponding to the revolutions.

6 Claims, 6 Drawing Sheets

METHOD AND APPARATUS FOR MEASURING A WEIGHT OF A STIRRING FLUID

BACKGROUND OF THE INVENTION

1. Field of the Invention

The present invention relates to a technique for measuring a weight of a stirring fluid, such as water or some other fluid, in stirrers applicable to a refrigerator, etc. More particularly this invention relates to a method and apparatus for measuring the weight of the fluid (hereinafter referred to as an "object fluid") which reduces measurement errors by a simple structure including a hall sensor.

2. Description of the Prior Art

FIG. 1 shows a schematic diagram of a stirrer adopting a conventional weight measuring apparatus. As shown, this apparatus includes an instruction input section 2 for accepting a user's instruction; a microcomputer 3 for computing a weight of an object fluid on the basis of an output frequency from a weight detecting section 1 and for providing a control signal pertinent to a load computed by the weight; a stirring motor driving section 4, driven by the control signal from the microcomputer 3, for driving the following stirring motor M; and a display section 5 for displaying an operation of a system under the control of the microcomputer 3.

FIG. 2 is a simplified view showing a general stirrer. In construction, it is composed of a driving section 7, in which a driving magnet 6 (specifically a circular permanent magnet) is assembled to a shaft of the stirring motor M, for generating a rotational power to stir an object fluid; a stirring magnet 8, assembled in the lower part of a container 10, for stirring an object fluid by interaction with the driving magnet 6; and a weight sensor 9, positioned under the container 10, for sensing a weight of an object fluid.

An operation of the above-constructed apparatus will be discussed with regard to FIG. 3.

When a user turns on a start switch SW1, the microcomputer 3 recognizes that a start instruction is offered through its input port P2 and drives the stirring motor driving section 4. Also, the microcomputer 3 computes the weight of an object fluid to be stirred, by using a frequency of an oscillating signal provided through its input port P1.

The weight sensor 9 constitutes two electrode plates facing each other. The electrostatic capacity between the plates can be used to measure a weight of an object fluid. Pressed by the weight of an object fluid, as shown in FIG. 3, the two electrode plates become closer, and the electrostatic capacity of the weight sensor 9 increases as follows:

$$C1 = \epsilon_o \epsilon_r \times S/d,$$

where "S" denotes the area of each metal plates; "d" the distance between the electrode plates; and "$\epsilon_o \epsilon_r$" the dielectric constant of a material within the plates.

In addition, an oscillation frequency (F) of an oscillation circuit 1A in the weight sensing section 1 is in inverse proportion to the electrostatic capacity C1 as shown the following formula:

$$F \propto 1/(R1+R2)C1.$$

It follows that, as a result, as the weight of an object fluid increases, the oscillation frequency of the oscillation circuit 1A decreases, and vice versa.

The microcomputer 3 checks the weight of an object fluid on the basis of the oscillation frequency. If it checks that the weight is less than a given value, it outputs a low-level signal through its output port P4 to turn on a light-emitting diode for an object fluid supply display LED1; if greater, it outputs a high-level signal through its output port P3 for a given time to drive the stirring motor M.

The driving magnet 6 rotates by the stirring motor M, and accordingly the stirring magnet 8 rotates by magnetic power from the driving magnet 6. An object fluid in a container will be stirred.

At this moment, the microcomputer 3 outputs a low-level signal through its output port P5 to turn on a light-emitting diode for operation display LED2. Thus a user can learn that stirring is being performed.

After a prescribed time, the microcomputer 3 turns off a relay for driving a motor RY1 by outputting a high-level signal through its output port P3, and accordingly the stirring motor M stops stirring. At the same time, the microcomputer 3 also outputs a low-level signal through its output port P6 to turn on a light-emitting diode for completion display LED3.

However, in such a conventional apparatus for measuring a weight, if an object fluid is contained all the time in a container, two electrode plates of a weight sensor are continuously kept pressed. This results in poor elasticity of electrode plates and accordingly the force of restitution is compromised. Measurement error therefore increases.

Besides, a variable resistor, added to compensate a tolerance of resistors and a variable capacitor (in this case, a weight sensor) which both constitute an oscillation circuit, makes the circuit complicated and adjustment difficult. Complexity in construction, in addition, raises cost of production. Especially, when a human or an animal approaches the weight sensor, electrostatic capacity variation increases the measurement error.

SUMMARY OF THE INVENTION

It is an object of the present invention to provide a method and apparatus for measuring a weight of an object fluid which detects, by using a hall sensor, the number of revolutions of a driving magnet driven by a stirring motor so as to compute a real weight of an object fluid by the detected revolutions.

According to one aspect of this invention, there is provided a method for measuring a weight of a stirring fluid, which stirs an object fluid by a stirring motor, by a driving magnet which rotates in accordance with a rotation of said stirring motor, and by a stirring magnet which rotates by magnetic power transferred from said driving magnet, the method comprising the steps of: detecting, by a hall sensor, the number of revolutions of said stirring motor by sensing magnetic power emanating from said driving magnet; computing a weight of an object fluid by using the detected number of revolutions of said stirring motor; and driving said stirring motor by said computed weight.

According to another aspect of this invention, there is provided an apparatus for measuring a weight of a stirring fluid, having a stirring motor for stirring an object fluid, a driving magnet which rotates in accordance with rotation of said stirring motor and a stirring magnet which rotates by magnetic power transferred from said driving magnet, the apparatus comprising: means for detecting the number of revolutions of said stirring motor by using magnetic power emanating from said driving magnet; control means, computing a weight of an object fluid corresponding to said detected number of revolutions of said stirring motor, for stopping, if said computed weight of an object fluid is equal to or less than a prescribed value, said stirring motor rotating, and for driving, if said computed weight of an object fluid is greater than the prescribed value, said stirring motor during a stirring time corresponding to said weight of an object fluid; means for controlling said stirring motor under a control of said control means; and means for accepting a user's operation instruction and for displaying an operation by said control means.

BRIEF DESCRIPTION OF THE DRAWINGS

The above object and other features of this invention will become more apparent by describing the preferred embodiments of the present invention with reference to the present invention with reference to the attached drawings, in which.

DETAILED DESCRIPTION OF THE PREFERRED EMBODIMENTS

Figure 1:
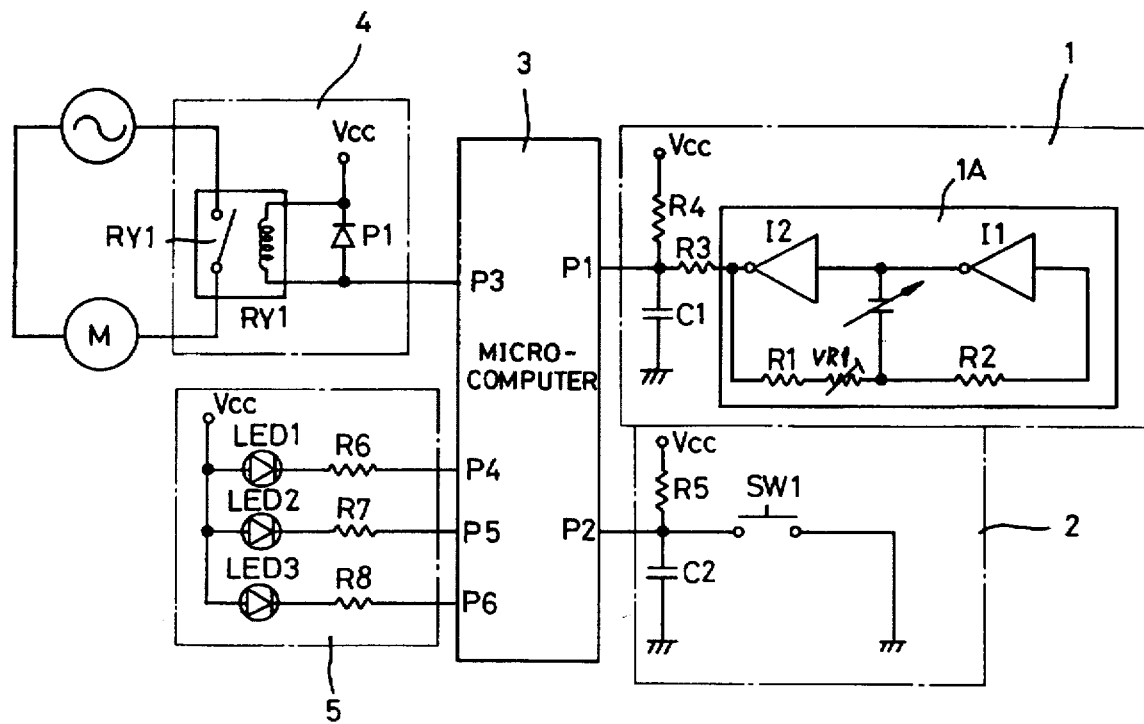
FIG. 1 is a schematic diagram of a stirrer adopting a general apparatus for measuring a weight of an object fluid.
Figure 2:
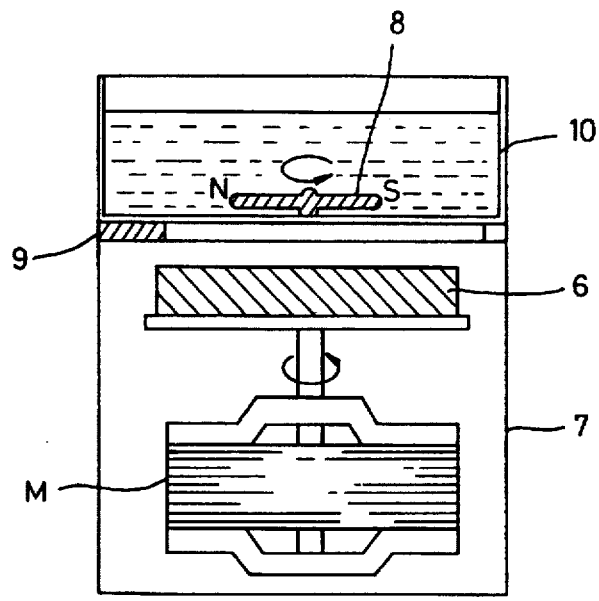
FIG. 2 is a simplified view showing a stirrer adopting a general weight measuring apparatus.
Figure 3:
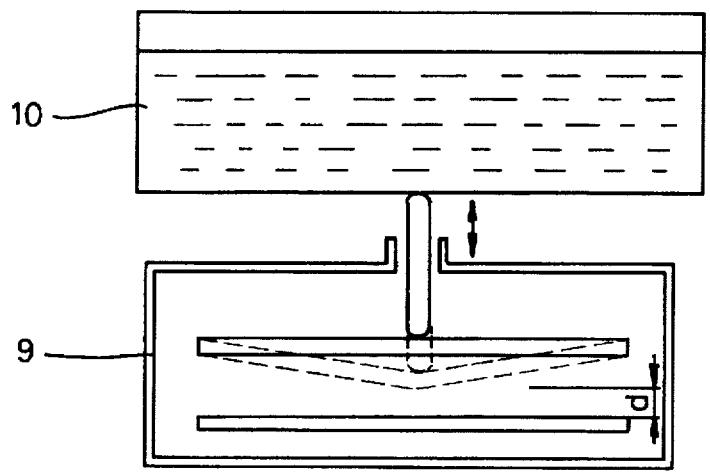
FIG. 3 is a simplified view showing a general weight measuring apparatus.
Figure 4:
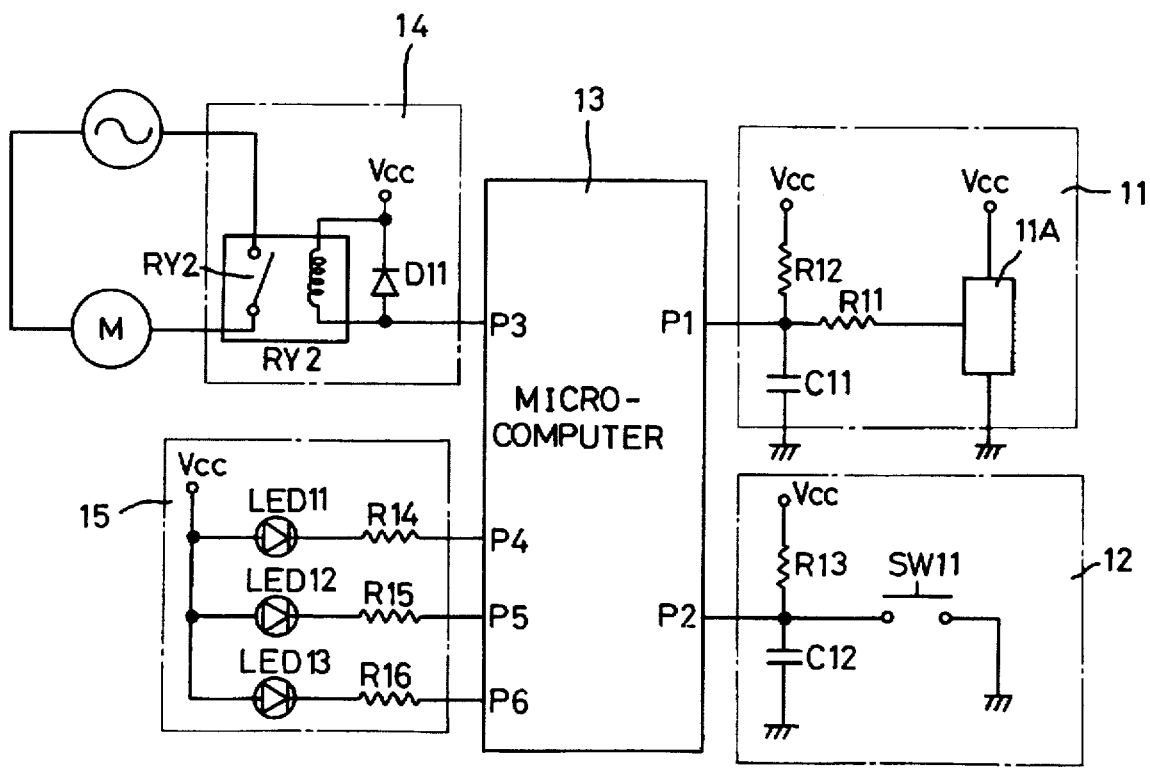
FIG. 4 is a schematic diagram of one preferred embodiment of the present invention.

FIG. 4 is a schematic diagram of one preferred embodiment of the present invention. As shown, it is composed of a weight detecting section 11 for detecting and outputting as a square wave the number of revolutions of the following stirring motor to measure a weight of an object fluid; an instruction input section 12 for accepting a user's operation instruction; a microcomputer 13 for computing a weight of an object fluid on the basis of an output frequency from the weight detecting section 11 and for providing a control signal pertinent to the computed weight; a stirring motor driving section 14, driven by the control signal from the microcomputer 13, for driving the stirring motor M; and a display section 5 for displaying an operation of a system under the control of the microcomputer 13.

Figure 5:
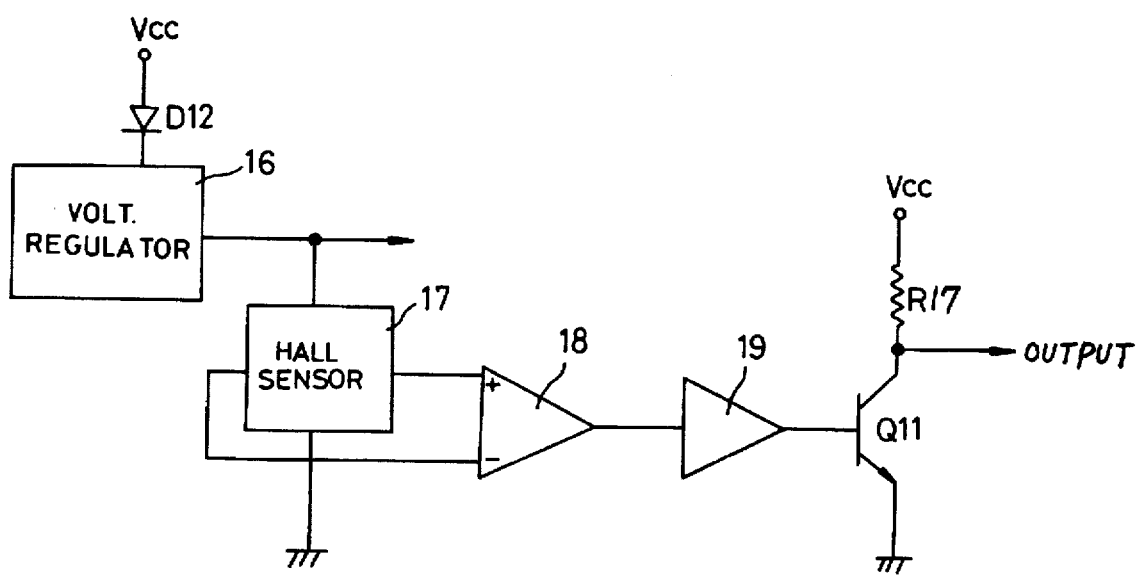
FIG. 5 is a block diagram of a hall sensor section shown in FIG. 4.

FIG. 5 is a block diagram of a hall sensor section 11A in the weight detecting section 11 depicted in. FIG. 4. In construction, it is composed of a voltage regulator 16 for regulating a source voltage; a hall sensor 17, working by the voltage from the voltage regulator 16, for providing a square pulse whose period corresponds to the revolutions of the following driving magnet 20; an amplifier 18 for amplifying the output pulse from the hall sensor 17 to such an extent that it is suitable to be treated to; a hysteresis buffer 19 for shaping accurately a level of the output from the amplifier 18; and a transistor Q11 which is switched in accordance with the output signal from the hysteresis buffer 19.

An operation of such a constructed apparatus of the present invention will be discussed with reference to FIGS. 4 to 9.

Figure 6:
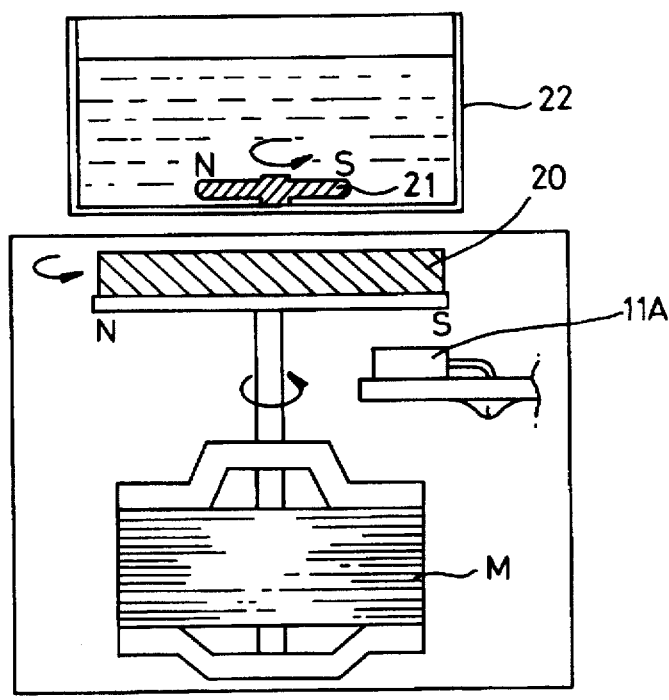
FIG. 6 is a simplified view showing a stirrer according to the present invention.

Under the condition that the stirring motor M illustrated in FIG. 6 reposes, the microcomputer 13 outputs high-level signals from its output ports P4–P6 to keep all of the light-emitting diodes in the displaying section 15, i.e., a light-emitting diode for object fluid supply display LED11, a light-emitting diode for operation display LED12, and a light-emitting diode for completion display LED13 in being turned off.

If a user activates a start key SW11, containing an object fluid in a container 22, the microcomputer 13 recognizes that a start instruction is offered through its input port P2. Then it controls a relay for driving a stirring motor RY2 by outputting a low-level signal through its output port P3 to drive the stirring motor M. At the same time, it turns on the light-emitting diode for operation display LED12 by outputting a low-level signal through its output port P5.

Figure 7:
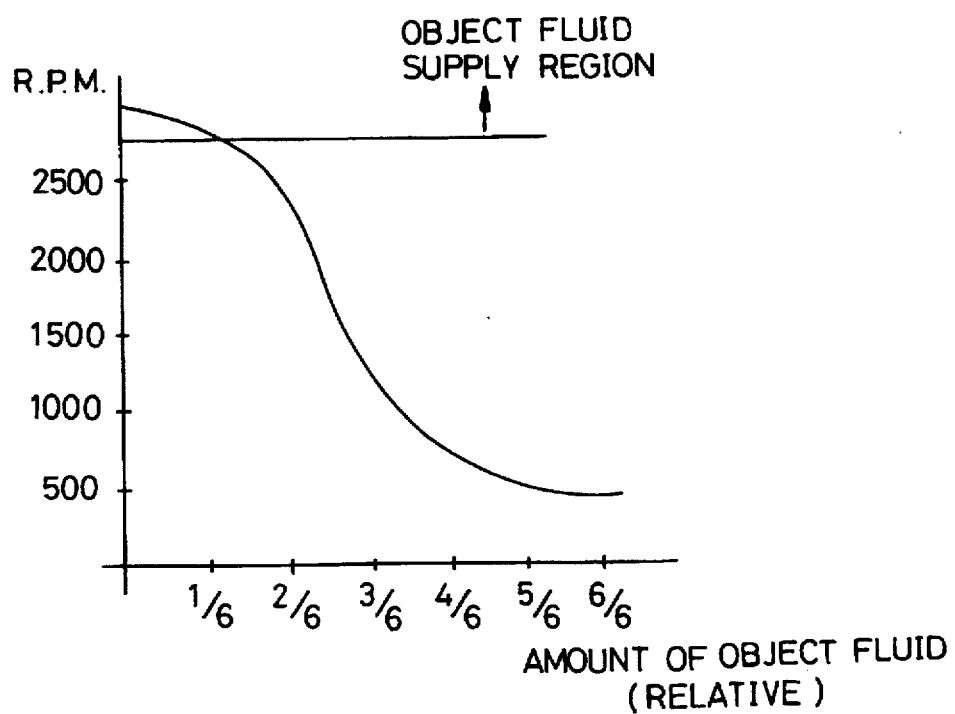
FIG. 7 is a graph showing the relationship between the amount of an object fluid and the number of revolutions of a stirring motor.

The driving magnet 20 rotates by the stirring motor M, and accordingly a stirring magnet 21 remotely rotates by the magnetic power from the driving magnet 20. Because a load imposed on the stirring motor M varies according to a weight of an object fluid in the container 22, the number of revolutions of the stirring motor M varies, as shown in FIG. 7, in accordance with the amount of a load.

The number of revolutions of the stirring motor M is detected by the hall sensor 17 and applied to the microcomputer 13.

Figure 8:
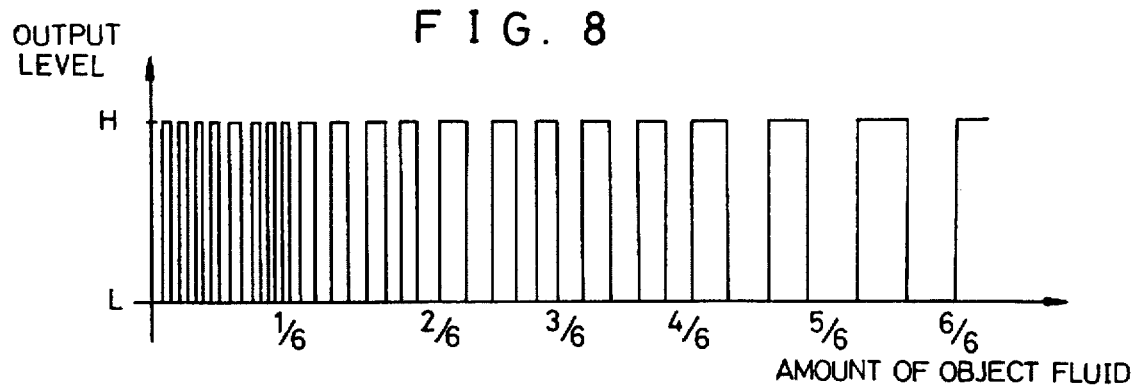
FIG. 8 shows an output waveform of a hall sensor depicted in FIG. 5.

As to the principle of revolution detection of a hall sensor, if a current appears in a hall sensor when the magnetic power of the driving magnet 20 is applied to the hall sensor 17, a hall voltage is created, which the direction of the voltage is perpendicular to the direction of both the magnetic power and the current. As the driving magnet 20 rotates, the magnetic power is rotatively stirred. Thereby the hall voltage appears in accordance with the revolutions of the stirring motor M, i.e., the weight of an object fluid, as is shown in FIG. 8.

The hall voltage, the output voltage of the hall sensor 17, is amplified by the amplifier 18 to such an extent that it can be suitably treated to and is thereafter level-shaped by the hysteresis buffer 19. Switched by the output of the hysteresis buffer 19, the transistor Q11 provides a pulse voltage to the input port P1 of the microcomputer 13.

The microcomputer 13 thereafter judges, on the basis of the period of the pulse signal from the hall sensor section 11A, how much an object fluid is in the container 20. If the amount is less than a given valve, the microcomputer 13 stops the stirring motor M rotation and turns on the light-emitting diode for object fluid supply display LED11; if greater, the microcomputer 13 rotates the stirring motor M during a stirring time pertinent to the amount of an object fluid and turns on the light-emitting diode for operation display LED12. After the stirring time elapses, the microcomputer 13 stops the stirring motor M rotation and turns on the light-emitting diode for completion display LED13.

Figure 10:
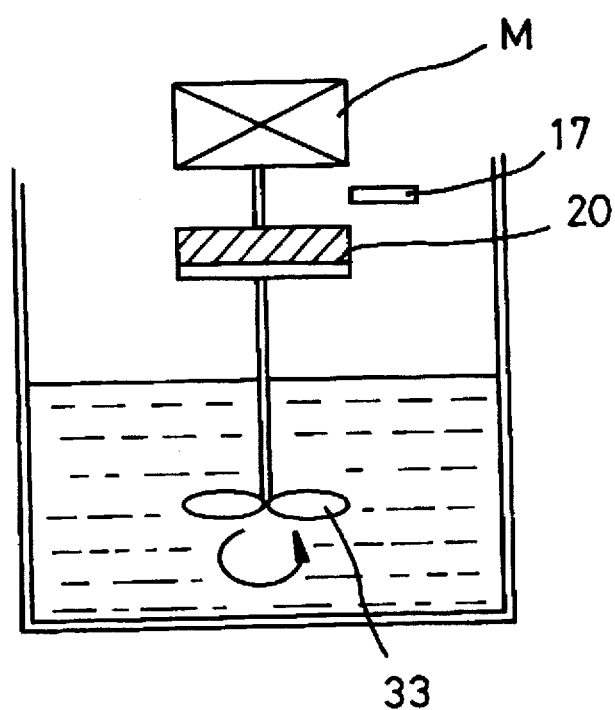
FIG. 10 shows another preferred embodiment of the present invention.

FIG. 10 shows a structural view indicating another preferred embodiment of the present invention. As shown, a stirring blade 33 instead of the stirring magnet 21 stirs directly an object fluid in the container 22.

Figure 9:
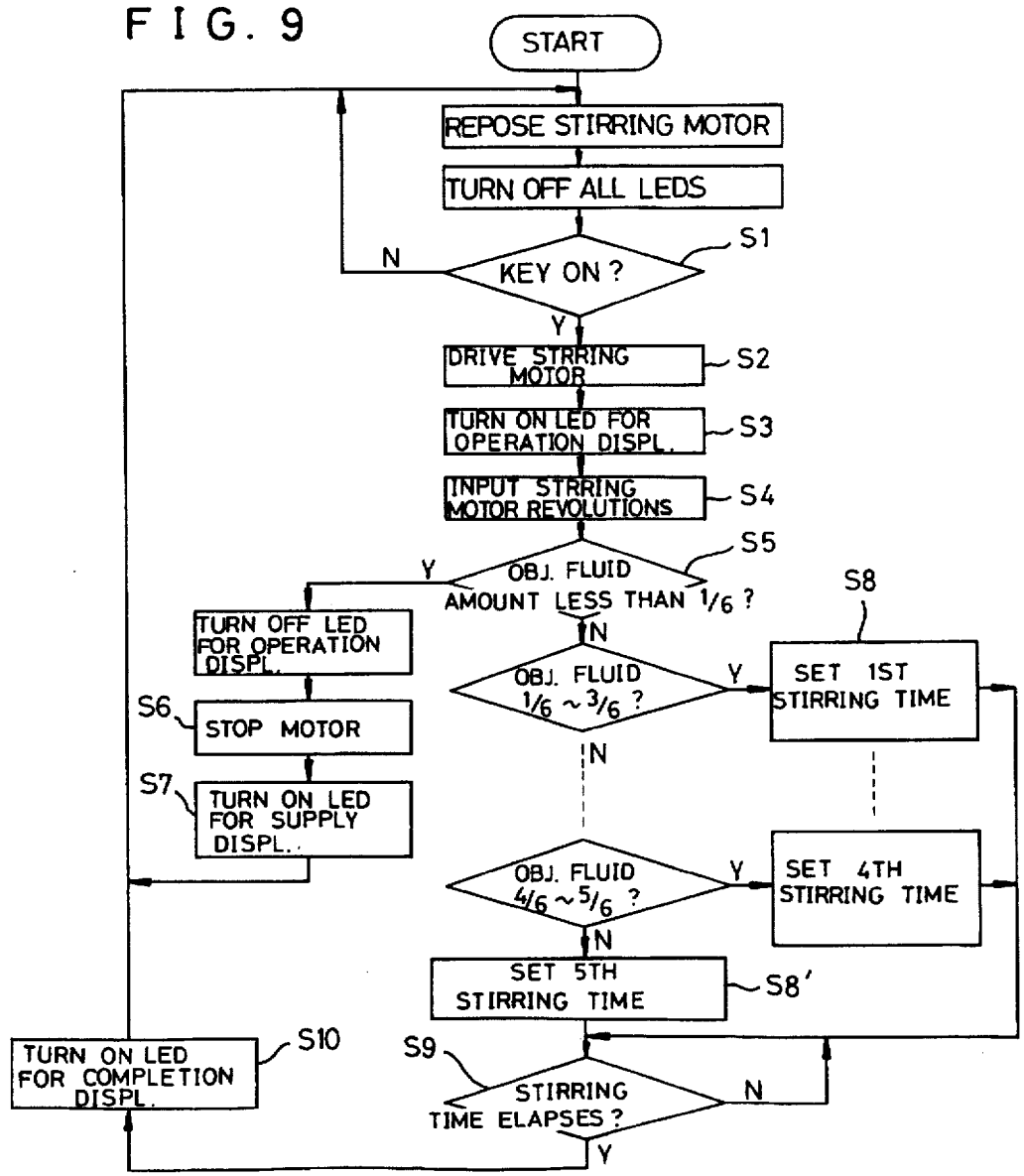
FIG. 9 is an operational flowchart of the present invention, a method for measuring a weight of an object fluid.

FIG. 9 is a flowchart showing the operation of the embodiment of FIG. 4.

If a user activates a start instruction (step S1), the stirring motor M rotates and the light-emitting diode for operation display LED12 is turned on. Thereafter the revolutions of the stirring motor M detected by the weight detecting section 11 is provided as a weight of an object fluid to the microcomputer 13 (steps S2 to S4).

The microcomputer 13 compares the revolutions of the stirring motor M, i.e., a weight of an object fluid, with a reference amount (step S5). If the revolutions are less than a given amount, the microcomputer 13 stops the stirring motor M rotation (step S6) and turns on the light-emitting diode for object fluid supply display LED11 to urge a user to supply the container 22 with an aiming fluid (step S7). In this embodiment, it was set to display an object fluid supply when the amount of an object fluid is less than one-sixth (⅙) of the capacity of the container 22.

In the mean time, if the revolutions are greater than a given amount, the microcomputer 13 computes a stirring time pertinent stepwise to a weight of an object fluid (steps S8 to S8') and rotates the stirring motor M during this stirring time.

If the stirring time elapses (step S9), the microcomputer 13 stops the stirring motor M rotation and turns on the light-emitting diode for completion display LED13 (step S10). A sequence of an operation cycle of the present invention is done as the above steps.

From the foregoing, the present invention measures a weight of an object fluid by detecting the number of revolutions of a driving magnet attached to a stirring motor, using a hall sensor rather than a mechanical sensor. Not having mechanical fatigue which is susceptible to be imposed upon a conventional mechanical weight sensor, the present intention can prevent errors caused by physical modification. In addition, this intention provides simple construction and unnecessary adjustment.

What is claimed is:

1. A method for measuring a weight of a stirring fluid, which stirs an object fluid by a stirring motor, by a driving magnet which rotates in accordance with a rotation of said stirring motor, and by a stirring magnet which rotates by magnetic power transferred from said driving magnet, the method comprising the steps of:

detecting, by a hall sensor, the number of revolutions of said stirring motor by sensing magnetic power emanating from said driving magnet;

computing a weight of an object fluid by using the detected number of revolutions of said stirring motor; and driving said stirring motor by said computed weight.

2. The method according to claim 1, wherein said stirring motor driving step comprises the steps of:

stopping said stirring motor rotation if said computed weight of an object fluid is equal to or less than a prescribed value; and driving, if said weight of an object fluid is greater than said prescribed value, said stirring motor during a stirring time corresponding to said computed weight of an object fluid, and stopping said stirring motor after said stirring time elapses.

3. The method according to claim 2, wherein said stirring time is installed more than at least one in accordance with said computed weight of an object fluid.

4. An apparatus for measuring a weight of a stirring fluid, having a stirring motor for stirring an object fluid, a driving magnet which rotates in accordance with rotation of said stirring motor and a stirring magnet which rotates by magnetic power transferred from said driving magnet, the apparatus comprising:

means for detecting the number of revolutions of said stirring motor by using magnetic power emanating from said driving magnet;

control means, computing a weight of an object fluid corresponding to said detected number of revolutions of said stirring motor, for stopping, if said computed weight of an object fluid is equal to or less than a prescribed value, said stirring motor rotation, and for driving, if said computed weight of an object fluid is greater than the prescribed value, said stirring motor during a stirring time corresponding to said weight of an object fluid;

means for controlling said stirring motor under a control of said control means; and means for accepting a user's operation instruction and for displaying an operation by said control means.

5. The apparatus according to claim 4, wherein said means for detecting the number of revolutions of said stirring motor comprises:

a voltage regulator for regulating a source voltage;

a hall sensor, working in said source voltage regulated by said voltage regulator, for detecting the number of revolutions of said driving magnet to output a pulse signal whose frequency corresponds to said detected number of revolutions of said driving magnet;

an amplifier for amplifying said pulse signal from said hall sensor;

a hysteresis buffer for shaping a level of said amplified pulse signal from said amplifier; and a transistor which is switched according to an output from said hysteresis buffer.

6. The apparatus according to claim 4, wherein said stirring time determined by said control means is installed more than at least one in accordance with said computed weight of an object fluid.

* * * * *